Aug. 27, 1968 YUKIO UENO 3,399,257
PRODUCTION OF TIRES

Original Filed June 23, 1965 2 Sheets-Sheet 1

INVENTOR
YUKIO UENO

BY
ATTORNEYS

Aug. 27, 1968  YUKIO UENO  3,399,257
PRODUCTION OF TIRES

Original Filed June 23, 1965  2 Sheets-Sheet 2

Yukio Ueno,
Inventor

By Wenderoth,
Lind and Ponack Attorneys

United States Patent Office 3,399,257
Patented Aug. 27, 1968

3,399,257
PRODUCTION OF TIRES
Yukio Ueno, Osaka, Japan, assignor to Kyowa Rubber Industry Co., Ltd., Osaka, Japan
Continuation of application Ser. No. 466,374, June 23, 1965. This application July 11, 1967, Ser. No. 652,629
Claims priority, application Japan, June 26, 1964, 39/36,571
1 Claim. (Cl. 264—134)

ABSTRACT OF THE DISCLOSURE

A method of producing a pattern in tires of different colors from the color of the body of the tire. A rubber layer of a given color is provided at the site of the pattern which is then coated with a differently colored rubbery material in a thin, two-millimeter layer. During molding and vulcanization a groove is provided in the mold of sufficient depth to permit flowing of the rubber material without a depression in the backing layer. The rubber flows smoothly into the vented groove or grooves to draw the overlying layer to a thin feather edge at the base of the projection. Upon cutting the projection at the base a substantially invisible line results in the pattern.

---

This is a continuation of Ser. No. 466,374, filed June 23, 1965, now abandoned.

The present invention relates to a method of producing a tire having fine line patterns or narrow line stripes, in desired positions on the tire surface, of a color different from the ground color of the tire.

Conventionally, in producing tires of this kind, for example, the so-called narrow white side wall tire having relatively wide white ribbons on the black side walls, there have been employed methods wherein an unvulcanized or semivulcanized white ribbon-shaped rubber sheet having a required length is adhered to the surface of an unvulcanized black rubber tire body and the assembly is placed in a metallic mold for molding and vulcanization, or the surface of a white rubber portion of a green tire body is coated with a black rubber and the same is subjected to molding and vulcanization and thereafter desired widths of stripes of the black coating rubber are removed therefrom by a rotary grinder to allow the underlying white portion to be exposed in the form of a ribbon on each side of the tire. However, in these methods, the boundary line between the black and white areas is liable to be rough or blurred and will not be a sharp line and the overall shape of the ribbon is liable to become irregular, so that, as is necessitated by the present trend towards pursuit of elegance, when the width of the ribbon is to be decreased to a very narrow form or a number of such narrow lines or stripes are to be provided, it is difficult to give them a form of distinct, regularly shaped elegant lines.

It is also known to provide desired white ribbons or line stripes on a black tire body by using a white rubber paint. This method, however, is not satisfactory because it lacks permanence because the paint easily scales off and like the above-mentioned methods it is liable to cause irregularlities in shape.

The present invention seeks to provide a novel method which overcomes the disadvantages inherent to the conventional methods by utilizing the regularlity of rubber in flow deformation.

The invention will now be described in more detail with reference to the accompanying drawings wherein.

Figure 1:
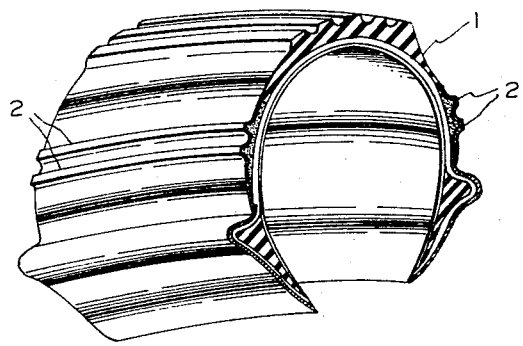
FIG. 1 is a perspective view of an example of tire produced according to the method of the invention.

FIG. 1 shows a perspective view of a section of a tire produced according to the method of the invention. In this embodiment, a black tire 1 has formed on either side wall thereof two thin white stripes 2. The two thin white stripes 2 on each side of the tire are located on concentric circles with the hub as their common center, so that when the wheel is rotated they will appear to be beautiful white concentric rings rotating outside the rim.

Figure 2:
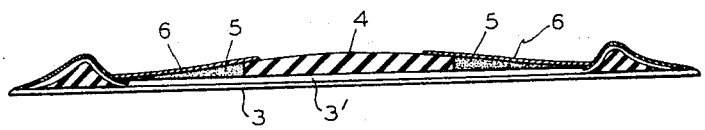
FIG. 2 is a cross-section showing the tire in a condition prior to molding and vulcanization.

FIG. 2 shows a section of the green tire before being placed in a mold for molding and vulcanization. The general construction of this assembly is well known in the art so that no detailed explanation is required except that pertaining to this invention. Indicated by the numerals 3 and 3' are sheets of fabric serving as carcass, 4 is a centrally raised black unvulcanized rubber body, and 5 is a white unvulcanized rubber body arranged between the body 4 and the head portion and butting at its edge with the side edge of the body 4 as shown. Indicated by the numeral 6 is a black unvulcanized rubber sheet which is extremely thin (about 0.2 millimeter) and so positioned as to cover the white unvulcanized rubber body 5. It will be understood that the white rubber body 5 is positioned in the area where the formation of white stripe(s) is desired. The unvulcanized assembly will then be subjected to the operation of an expander to give it the general configuration of a tire and it will be thereafter placed in a metallic mold for final molding and vulcanization.

Figure 3:
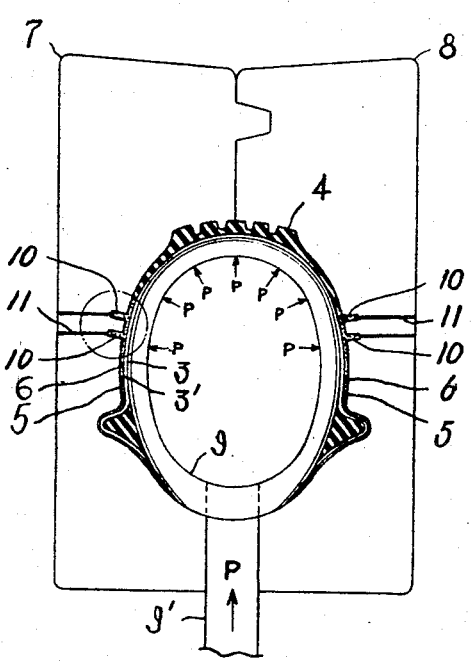
FIG. 3 is a cross-section of said tire in a mold for molding and vulcanization.

FIG. 3 is a section illustrating the conditions for effecting the molding and vulcanization. Right and left metallic molds 7 and 8 are butted against each other to define an annular inner cavity having the shape of the desired tire and in which said unvulcanized assembly or green tire is placed and is pressed against the cavity wall owing to the internal pressure P in an air bag 9 expanded by pressurized air introduced through the valve 9'. The molding and vulcanization may be conducted in a manner well known in the art so that no detailed explanation is necessary except that pertaining to this invention which is to be explained in the following.

Figure 4:
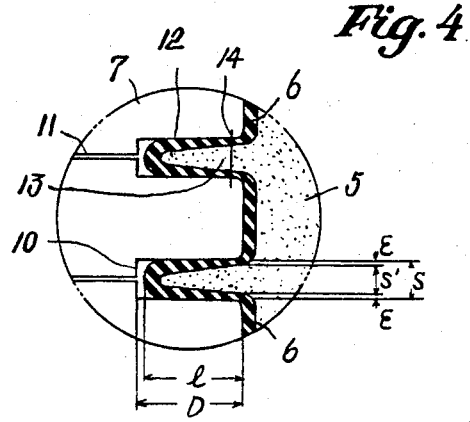
FIG. 4 is an enlarged section of a part of the tire shown in FIG. 3.

The important feature of this invention is in the provision of grooves 10 in each of the molds 7 and 8. Thus as shown in FIGS. 3 and 4, each of the metallic molds 7 and 8 is provided with a required number and form of grooves 10 each communicating at its bottom with the atmosphere through a vent 11 or the like. When the unvulcanized assembly is pressed against the wall of the mold cavity owing to the air pressure P injected through the valve 9' into the air bag 9, a portion of the white rubber body 5 with the overlying black rubber sheet 6 expands or flows into the groove 10 forming a sprue 12 therein as clearly shown in FIG. 4. The extension or sprue 12, when having grown to a length $l$, is solidified or set in this state since the internal pressure is brought into equilibrium as the vulcanization proceeds.

In carrying out the method of this present invention, the width S and depth D of the groove 10 should be carefully selected. It should be noted that the width S, though determined by the width desired for the white stripe 2 on the tire, i.e., determined by the desired external appearance, is related to the depth D. Further, if the width S is too large an excessively large amount of rubber is caused to flow into the groove to cause depressions on the surface of the carcass 3 thereby adversely affecting the tire. Therefore, in order to avoid this, the width S should be selected to have a value within a certain limit.

The depth D of the groove 10 is related to the width S and the rate of vulcanization and should be large enough to enable smooth growth of the sprue 12. If the width S, depth D and vulcanization rate of rubber are proper, the sprue 12 will grow without hindrance until it attains the length *l* in the groove 10. In such case, the white rubber 5 and the extremely thin black rubber layer 6 covering the former will regularly and smoothly flow into the groove 10 without disturbance. And if the length is sufficient, the thickness *e* of the black rubber layer 6 at the neck 13 of the sprue 12 will be extremely small and the thickness S' of the white rubber portion of the neck 13 will closely approach the given width S of the groove 10.

It has been found that in case of a standard bicycle tire (26 x 1⅜", side wall 2 millimeters in thickness), a satisfactory result is obtained when S is about 0.5–2.0 millimeters and D is longer than about 2 millimeters.

The tire molded and vulcanized in this manner is removed from the metallic molds and each sprue 12 is cut off at the neck line 14 with a suitable cutter blade, whereupon patterns of white lines or stripes as shown in FIG. 1 appear.

Although, for the convenience of explanation, a case in which a black tire is relieved with two annular white line stripes has been shown by way of example, a combination of other colors may of course be used, and such white line stripes may be replaced by other patterns consisting of fine lines or letters consisting of fine lines.

As mentioned above, according to the invention, a unvulcanized thick rubber layer of a desired color different from the tire body is arranged in the desired area on an unvulcanized or green tire and coated with a thin rubber layer of a color different from the thick rubber layer, and the assembly is molded and vulcanized under pressure within a mold having a groove so that a portion of the thick rubber layer with its overlaying thin rubber layer flows into the groove to form a thin sprue, which is then cut off to expose a portion of the thin rubber layer in a pattern shape defined by the groove and which is different from the ground color of the tire body. The method is easy to carry out and the pattern obtained is distinctive, clear and sharp, and is highly resistant to wear.

The method of this invention may be applied to various kinds of pneumatic tires, but is preferably applied to pnuematic tires for bicycles, motor-bicycles and automobiles.

I claim:
1. A method of producing a rubber tire having a pattern on the face thereof of a color different from the color of the tire body, which comprises providing an unvulcanized thick rubber layer of the desired color of the pattern in the area of the tire body where the formation of the pattern is desired, coating the said rubber layer with at least one thin unvulcanized layer having a thickness of about 0.2 millimeter of a color different from the color of said thick rubber layer, providing a mold having a mold wall defining a mold cavity, molding and vulcanizing the green tire with tehse layers in said mold, providing a groove in the mold wall substantially perpendicular to the surface of the wall and having a cross-section in the shape of the desired pattern, flowing a portion of the thick and thin rubber layers into the groove to form a projection, the step of providing the groove comprising providing a groove having a width of 0.5–2.0 millimeters and more than 2 millimeters in depth so as not to cause a depression in the back face of the thick rubber layer when the rubber flows into the groove, said flowing step, under the molding and vulcanizing conditions in the mold, comprising flowing the rubber material smoothly into the groove while drawing the thin overlying rubber layer to an extremely small thickness while the thickness of the thick rubber layer approaches the width of the groove, venting said groove to the atmosphere from the bottom thereof, then removing the vulcanized tire from the mold, and cutting off the projection adjacent the face of the tire, whereby the thick rubber layer of the desired color will be exposed in the shape of the desired pattern and the thin rubber layer will be substantially invisible along the edges of the exposed thick rubber layer.

References Cited

UNITED STATES PATENTS 2,789,616    4/1957    Cuthbertson    264—248 X
2,865,423   12/1958    Renaud    264—248 X ROBERT F. WHITE, *Primary Examiner.*

R. R. KUCIA, *Assistant Examiner.*